3,398,900
HIGH SHEAR DISPERSION UNIT
Peter Guba, 483 Eastbrook Road, Ridgewood, N.J. 07450, and Charles Sweeney, 8504 Tallwood Road, Lutherville, Md. 21093
Filed Nov. 23, 1966, Ser. No. 596,611
10 Claims. (Cl. 241—67)

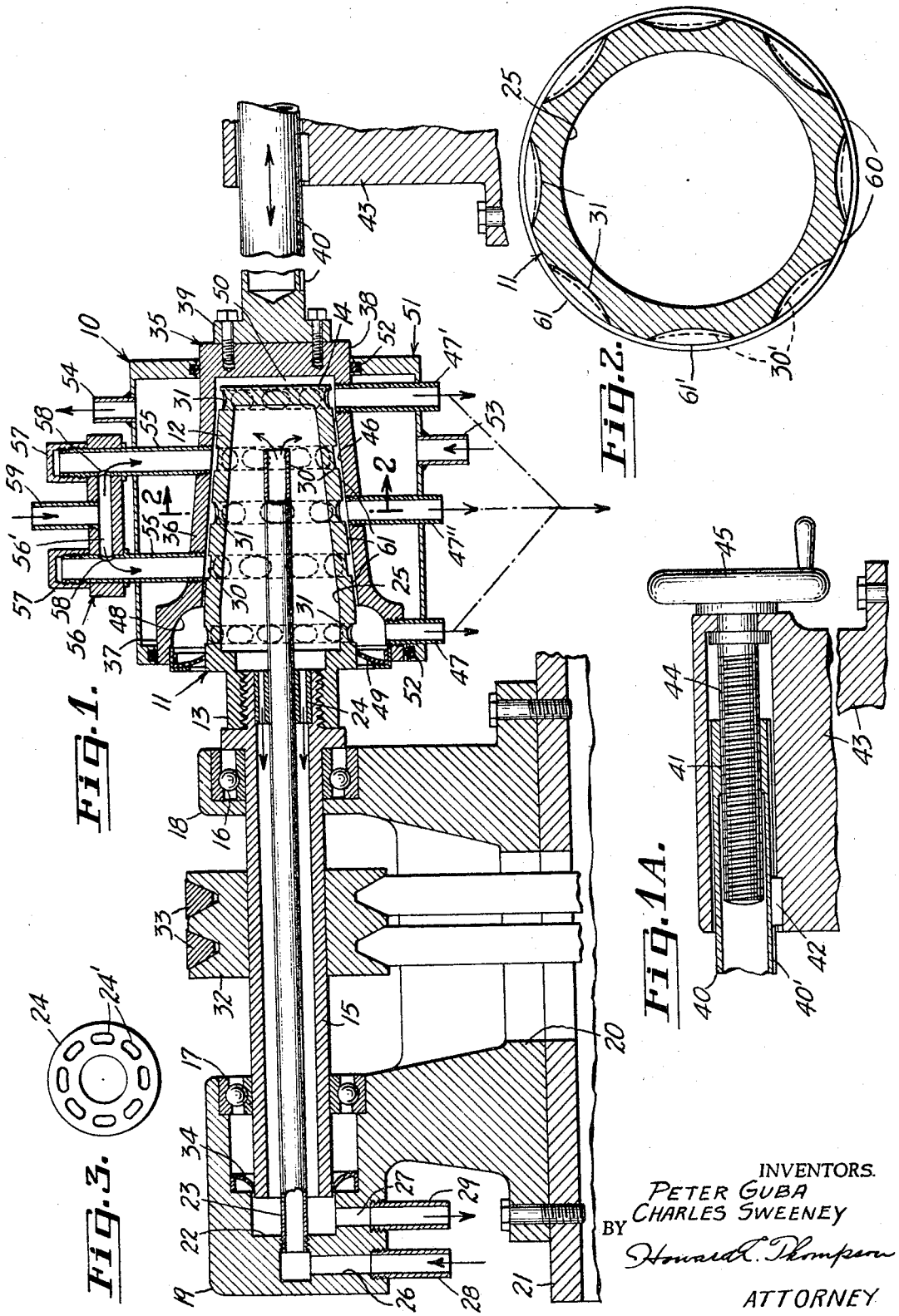

This invention relates to dispersion units adapted to reduce the particle size of any granular solid which can be pre-mixed or blended in a liquid medium and pumped or pressure fed into the unit and where the pressure employed will vary in accordance with the viscosity of the blend and the flow rate which would be required. More particularly, the invention deals with a unit of the character defined employing means providing a high speed shearing action to reduce the coarse agglomerates to a particle size small enough to pass through a controlled clearance which is provided and controlled by manually adjustable means.

Still more particularly, the invention deals with a unit of the character defined having means for internally and externally cooling rotor and stator means producing the shearing action in providing a temperature control suitable for the end product being sheared.

The novel features of the invention will be best understood from the following description, when taken together with the accompanying drawing, in which certain embodiments of the invention are disclosed and in which the separate parts are designated by suitable reference characters in each of the views and in which:

FIG. 1 is a diagrammatic sectional view through the major part of a unit made according to the invention, parts of the construction being shown in elevation and parts broken away.

FIG. 1A is a view showing the other portion of the complete unit, with parts shown in elevation and parts broken away.

FIG. 2 is a partial section on the line 2—2 of FIG. 1 showing the rotor of the unit; and FIG. 3 is a face view of an apertured bearing which is employed.

The dispersion unit is generally identified by the reference character 10. This unit comprises a rotor 11 consisting of a hollow tapered casing 12, having an internally threaded sleeve end 13 and a closed end 14. Coupled with the end 13 is a tubular rotor sprindle 15 mounted in spaced bearings 16 and 17 supported in spaced uprights 18 and 19 of a block 20 bolted or otherwise secured to a suitable support, indicated, in part, at 21.

The spindle 15 extends into a chamber 22 in the upright 19. Mounted in the upright 19 and arranged axially of the bore of the spindle 15 is an elongated coolant tube 23 having a bearing support in 15 through the medium of an apertured bearing 24, the apertures of which are shown at 24' in FIG. 3 of the drawing. The tube 23 extends into a chamber 25 in the tapered casing 12 and this tube terminates short of the end wall 14 of the casing, as clearly shown.

The upright 19 has inlet and outlet bores 26 and 27, with which inlet and outlet tubes 28 and 29 communicate for the introduction and discharge of a coolant medium which extends through the tube 23 into the chamber 25 and then passes out through the spindle 15 around the tube 23, as will be apparent.

The outer surface of the casing 12 of the rotor 11 has two series of circumferentially spaced shearing recesses 30 and three series of outlet and discharge recesses 31, the functions of which will be later described.

Suitably fixed or keyed to the spindle 15 is a drive pulley 32 engaged by drive belts 33, which are driven by a variable drive electric motor, which is not shown, as motors of this type and kind are well known in the art. The end of the spindle 15 arranged in the upright 19 is sealed by a sealing ring 34.

Arranged around the rotor 11 is a stator 35 comprising a conical housing 36 provided with an open flat end 37 and a closed end having a flat 38. Fixed to the closed end is the flanged end 39 of an adjustable stator tubular shaft 40, having an internally threaded end 41. The shaft 40 has a keyway 40' engaging a key 42 mounted in a block 43, which is also fixed to the support 21 in spaced relation with respect to the block 20. The extension to the support 21 is not shown, but will be apparent from the partial showing of the block 43 in FIG. 1, the remainder of this block 43 being shown in FIG. 1A.

Rotatably mounted and keyed in the block 43 is a feed screw 44 engaging the threads 41 in adjusting the position of the stator 35 with respect to the rotor 11. A hand wheel 45 is fixed to the outer end of the screw 44. The adjustment of the stator 35 controls the spacing of the conical bore 46 of the stator with respect to the periphery of the tapered casing 12 gauging the degree of shear required and grinding required.

Coupled with the stator 35 are product outlet or discharge tubes 47, 47', 47''. It will appear that the tubes 47, 47' are mounted in the flat ends 37, 38; whereas, the tube 47'' is arranged centrally of the stator 35. All of these tubes are in registering alinement with the recesses 31. The tube 47 opens into the chamber 48 and this chamber has a sealing ring 49. The end 38 of the stator 35 has a chamber 50, with which the tube 47' communicates.

Mounted on the stator 35 is a jacket 51 sealed, as seen at 52. The tubes 47, 47', 47'' project through the jacket 51 for discharge into a suitable receiving receptacle which is not shown. Mounted in the jacket 51 is an inlet tube 53 for temperature control means or medium for cooling of the stator 35 positioned within said jacket.

At the top of the jacket 51 is fixed an outlet tube 54 for discharge of the coolant.

Fixed to the top of the stator 35 are projecting feed tubes 55 in registering alinement with the recesses 30. The tubes 55 project through the jacket 51 and are mounted in a manifold 56, including a chamber 56'. The manifold 56 is fixed on the tubes 55 by clean-out caps 57. The tubes 55 have apertures 58 registering with the chamber 56'. Coupled with the manifold 56 and communicating with the chamber 56' is an inlet pipe 59 for admission of the product to be processed which is pressure injected into the unit at a pressure of approximately 200–225 p.s.i., at least, in the example of use of the unit later noted.

Considering FIG. 2, this is a section through one of the circumferentially spaced discharge recesses 31, these recesses being joined by an inwardly set circumference 60. The restricted circumferences of the rotor are indicated at 61 in FIG. 2 and on several surfaces in FIG. 1. These surfaces control, in their spacing with respect to the conical bore 46, the final grinding of the material being processed.

The recesses 30 are shallower than the recesses 31 and this is indicated by the dotted line illustration in FIG. 2, assuming that the dotted line showing would be a section through the recesses 30, in which event, the line 61', FIG. 2, would be equivalent to 61, as seen in FIG. 1.

Considering FIG. 1 of the drawing, it will be apparent that one of the surfaces 61 is at each side of the two series of recesses 30. In other words, upon admission of the material to be processed into the stator through the tubes 55, this material first is processed or sheared by the recesses 30, then distributed to the controlling areas at each side thereof, as at 61 and finally passed into the areas controlled by the recesses 31, two of which operate within the chambers 48 and 50.

In the use of the apparatus and in processing most materals, it will be desirable to circulate a suitable coolant into and through the chamber 25 of the rotor 11, as well as into and through the jacket 51 to cool the stator 35 to control or provide approximate temperatures of the sheared and ground product positioned between the rotor and stator and discharged through 47, 47' and 47" into a suitable receptacle for drying or other processing. The blended material, which is pre-mixed in what might be termed the first stage by agitation of the components of this mix, is then pressure fed through the product admission pipe 59 for discharge through 55 into the stator 35 in registering alinement with the shearing recesses 30 while the rotor 11 is rotated at a predetermined speed, depending upon the mix which has been introduced and, in the example later given, a speed of approximately 1200 r.p.m. is employed. The high speed shearing action reduces the coarse particles to a particle size small enough to enter the controlled clearance between surfaces 61 and the bore 46, at which surfaces a more intense shearing action reduces the particles to the desired size. These reduced partcles then enter the outlet recesses 31 and the chambers 48 and 50 for discharge through the tubes 47, 47' and 47" into the receiving receptacle, as previously defined. This discharge product is then suitably dried for production of the resulting end product. In some instances, the blended material introduced into the unit can contain particles of sizes larger than 500 microns; whereas, after processing, the processed or end product would have the particle sizes at a range of about 1 micron.

While units of the type and kind under consideration will have many uses, by way of illustrating one use, the blend of the material to be processed can be a solution of shellac in water-ammonia (adjusted to pH of 8.5) utilized as the vehicle and chrome yellow medium pigment. By percentage and weight, this formula can be as follows:

|  | Percent | Pounds |
| --- | --- | --- |
| Shellac varnish | 45 | 2.25 |
| Chrome yellow pigment | 55 | 2.75 |
|  | 100 | 5.00 |

The foregoing combination is thoroughly agitated in a suitable container for a period of about five minutes, resulting in a blend which will be approximately at the temperature of 72° F. The viscosity of this material, by test, would be viscosity of 34 seconds (Zahn cup #3). This material is then pressure fed through the pipe 59, as previously stated and, in the shearing and grinding operation, the coolant is operated to maintain a temperature of approximately 80°–90° F. of the processed material discharged through the tubes 47, 47', 47". The viscosity of the processed material in the example given above would be a viscosity of 42 seconds (Zahn cup #3). It will be apparent that, in different uses of the unit, the stator will be manually adjusted to control the spacing between surfaces 61 and the walls of the chamber or bore 46 and, with some types of granular material, two or more passes of the material through a unit of the kind disclosed can be made in attaining a final end result and through the varied adjustments of the stator in each pass or processing.

It will be understood that, with different processings, the speed of rotation of the rotor 11 can be varied. Further, while coolants will be circulated for temperature control in many instances, it is also possible that, in some cases, these circulating passages for the coolants as described, can be utilized for the circulation of a temperature control medium of any type or kind, the purpose being to control characteristics of the product mixture or blend in its positioning between the rotor and stator and discharged from the several discharge tubes employed.

The material employed in the unit, particularly those engaged by the products being processed and particularly the surfaces of such materials, will be selected according to the chemical and physical nature of the treated material. In other words, they should be resistant to acids, alkalis, solvents and abrasives. Care taken in this respect will reduce deterioration of the equipment of the unit and avoid any contamination of the material being processed.

Having fully described our invention, what we claim as new and desire to secure by Letters Patent is:

1. A dispersion unit comprising a hollow rotor and a hollow stator having conical cooperating surfaces, a tubular spindle coupled with the rotor, the rotor having a chamber with which the bore of said spindle communicates, a small diameter tube arranged in the bore of said spindle and having one end extending and opening into said chamber, means at the other end of said tube and the corresponding end of said spindle for introducing and discharging a temperature control medium with respect to said chamber in controlling the temperature of material processed by said rotor, means coupled with said stator for adjusting the spacing between the cooperating surfaces of the rotor and stator, a jacket spaced from and enveloping said stator, means for sealing the jacket on flat ends of said stator, means for introducing and discharging a temperature control medium with respect to said jacket to further control the temperature of the material processed in said stator, means for driving said rotor, means passing through said jacket and coupled with said stator for delivery of a pressure fed blended material for shearing and grinding thereof by the rotor and stator in the rotation of said rotor, said rotor having circumferentially spaced shearing means on the surface thereof, alined with said last named means, for shearing said pressure delivered material, said rotor having restricted surfaces at sides of said shearing means, said rotor having longitudinally spaced discharge means for delivery of the sheared and ground product to product discharge tubes alined with said discharge means, and said last named tubes being coupled with said stator and said jacket.

2. A unit as defined in claim 1, wherein said spindle has spaced bearing supports in a block, means for sealing the spindle in one of said supports, and said one support having bores communicating with said first named means and adjacent ends of said spindle and tube.

3. A unit as defined in claim 2, wherein said rotor drive means comprises a motor driven pulley fixed to the spindle and arranged between said bearing supports.

4. A unit as defined in claim 1, wherein said shearing means comprises circumferentially spaced recesses on the surface of said rotor.

5. A unit as defined in claim 4, wherein said discharge means includes circumferentially spaced recesses on inwardly set surfaces of said rotor.

6. A unit as defined in claim 1, wherein said second named means comprises a shaft sliding in and keyed to a support block, a feed screw in threaded engagement with said shaft, and means for rotating said feed screw.

7. A unit as defined in claim 1, wherein said tube includes a bearing support in said spindle apertured to provide circulation of the temperature control medium.

8. A unit as defined in claim 1, wherein the sixth named comprises a pair of tubes communicating with a manifold chamber and an admission pipe opening into said manifold chamber.

9. A unit as defined in claim 1, wherein the blended material is thoroughly agitated before being pressure fed at 200–225 p.s.i. into the unit, and the temperature control mediums circulated through the jacket and said rotor being coolants.

10. A unit as defined in claim 9, wherein in the operation of the unit the blended material contains particles of about 500 microns which, when sheared and ground by the rotor and stator, will result in a delivered end product having particles of 1 micron.

References Cited

UNITED STATES PATENTS

| | | | |
|---|---|---|---|
| 938,923 | 11/1909 | Walker | 241—67 |
| 1,851,071 | 3/1932 | Travis | 241—67 X |
| 2,591,966 | 4/1952 | Rider | 241—66 X |

ANDREW R. JUHASZ, *Primary Examiner.*

FRANK T. YOST, *Assistant Examiner.*